United States Patent
Clement et al.

(10) Patent No.: US 12,296,608 B2
(45) Date of Patent: May 13, 2025

(54) METHOD FOR MANUFACTURING A DECORATIVE FOIL AND A PANEL COMPRISING SUCH FOIL

(71) Applicant: Unilin, BV, Wielsbeke (BE)

(72) Inventors: Benjamin Clement, Waregem (BE); Sam Ledegen, Ghent (BE)

(73) Assignee: Unilin, BV, Wielsbeke (BE)

( * ) Notice: Subject to any disclaimer, the term of this patent is extended or adjusted under 35 U.S.C. 154(b) by 373 days.

(21) Appl. No.: 17/427,846

(22) PCT Filed: Jan. 30, 2020

(86) PCT No.: PCT/IB2020/050724
§ 371 (c)(1),
(2) Date: Aug. 2, 2021

(87) PCT Pub. No.: WO2020/161569
PCT Pub. Date: Aug. 13, 2020

(65) Prior Publication Data
US 2022/0126617 A1 Apr. 28, 2022

Related U.S. Application Data

(60) Provisional application No. 62/801,314, filed on Feb. 5, 2019.

(30) Foreign Application Priority Data

Feb. 21, 2019 (EP) .................................. 19158475

(51) Int. Cl.
| B41M 5/00 | (2006.01) |
| B32B 37/18 | (2006.01) |
| B32B 38/00 | (2006.01) |
| B41M 5/52 | (2006.01) |

(52) U.S. Cl.
CPC ........... *B41M 5/0017* (2013.01); *B32B 37/18* (2013.01); *B32B 38/145* (2013.01); *B41M 5/0047* (2013.01); *B41M 5/0064* (2013.01); *B41M 5/5218* (2013.01); *B41M 5/5281* (2013.01); *B32B 2307/412* (2013.01); *B32B 2451/00* (2013.01)

(58) Field of Classification Search
CPC .......... B32B 2307/412; B32B 2451/00; B32B 37/18; B32B 38/145; B41M 5/0011; B41M 5/0017; B41M 5/0047; B41M 5/0064; B41M 5/508; B41M 5/52; B41M 5/5218; B41M 5/5227; B41M 5/5254; B41M 5/5263; B41M 5/5281
See application file for complete search history.

(56) References Cited

U.S. PATENT DOCUMENTS

| 5,401,699 | A | 3/1995 | Ohashi et al. |
| 6,277,477 | B1 * | 8/2001 | Tracy ................... B41M 5/5254 427/105 |
| 2002/0189183 | A1 | 12/2002 | Ricciardelli |
| 2006/0003116 | A1 * | 1/2006 | Missell ................. B41M 5/506 428/32.34 |
| 2022/0126617 | A1 * | 4/2022 | Clement ................. B41M 5/52 |

FOREIGN PATENT DOCUMENTS

| AU | 2007202698 A1 | 7/2007 | |
| CN | 1642410 A | 7/2005 | |
| CN | 101772423 A | 7/2010 | |
| CN | 105899371 A | 8/2016 | |
| CN | 107428188 A | 12/2017 | |
| CN | 108350295 A | 7/2018 | |
| CN | 108495753 A | 9/2018 | |
| EP | 0125113 B1 | 11/1984 | |
| EP | 0888904 B1 | 1/1999 | |
| EP | 1610957 B1 | 1/2006 | |
| EP | 3401730 A1 | 11/2018 | |
| EP | 3415337 A1 | 12/2018 | |
| EP | 3693180 A1 * | 8/2020 | ............. B32B 37/18 |
| FR | 2352667 A1 * | 3/1976 | |
| FR | 2352667 * | 3/1978 | |
| WO | 2011077311 A2 | 6/2011 | |
| WO | 2011141849 A2 | 11/2011 | |
| WO | 2015140682 A1 | 9/2015 | |
| WO | 2016146565 A1 | 9/2016 | |
| WO | 2017087725 A1 | 5/2017 | |

OTHER PUBLICATIONS

English translation of EP1116597.*
Translation of EP1116597.*
Translation of EP3693180.*
Translation of KR101956136.*
Translation of WO200403093.*
Eric Hanson, "How an ink jet printer works", retrieved from the internet at https://www.imaging.org/site/IST/Resources/Imaging_Tutorials/How_an_Ink_Jet_Printer_Works/IST/Resources/Tutorials/Inkjet_Printer/aspx?hkey=5c0e9b54-b357-4dbb-b440-f07557f5163e, Jan. 1, 2015, 3 pages.

* cited by examiner

*Primary Examiner* — Sonya M Sengupta
(74) *Attorney, Agent, or Firm* — Capitol City TechLaw

(57) ABSTRACT

A method for manufacturing a decorative foil may involve providing a thermoplastic carrier layer. An ink receiving layer may be provided to the carrier layer. A decorative pattern may be formed on the carrier layer by performing a digital printing operation wherein droplets of aqueous inks having a volume smaller than 100 pL are jet to the carrier layer, more particularly to the ink receiving. The ink receiving layer may comprise a binding agent, preferably different from an acrylic copolymer, and/or silica.

14 Claims, No Drawings

METHOD FOR MANUFACTURING A DECORATIVE FOIL AND A PANEL COMPRISING SUCH FOIL

This application claims priority under 35 USC 119(e) to U.S. provisional patent application No. 62/801,314, which was filed on Feb. 5, 2019, and under 35 USC § 119(a)-(d) to EP patent application No. 19158475.4, which was filed on Feb. 21, 2019, the entire contents of both of which are incorporated herein by reference.

BACKGROUND

1. Field

This invention relates to a method for manufacturing a decorative foil which may be applied at least as a part of the decorative layer of a decorative panel. More particularly, the decorative foil that is obtained through the present invention can be applied with floor panels, wall panels, ceiling panels, furniture panels and the like.

The decorative foils of the invention comprise a thermoplastic, preferably white, carrier layer, such as a carrier layer which is based on polyvinylchloride, preferably rigid PVC (i.e. with less than 3 phr plasticizer content, or no plasticizer content at all), and a decorative printed pattern provided on said carrier layer. Such decorative foils may e.g. be used as the decorative layer of floor panels, preferably for floor panels of the type which substantially are made of synthetic material. The decorative foil is usually finished with at least a transparent wear layer, which is preferably made of the same thermoplastic material. Such panel may comprise coupling parts on at least two opposite edges, said coupling parts being of the type allowing to couple two of such panels to each other. Floor panels which are designed in this manner are known, amongst others, from documents US 2002/0189183, WO 2011/077311, WO 2011/141849 and WO 2017/087725.

2. Related Art

In accordance with the prior art, the decorative foil is printed using offset printing techniques, and the lamination of the decorative foil and wear layer may be performed by pressing and heating, e.g. at 165° C. during 175 s at 4 kg/cm². Recently, e.g. from WO 2015/140682, techniques are known for manufacturing decorative foils using digital printing techniques. Digital inkjet printing techniques are particularly cumbersome for printing on thermoplastic carriers destined for subsequent lamination when high resolution and accordingly small droplets of inks are required to be jetted. Where small droplets need to be jetted, print heads with small nozzle openings are used. The viscosity of the ink must be lower with smaller nozzle openings to avoid clogging of the nozzles, and accordingly, e.g. water based inks, comprise a high amount of water in order to create the optimal rheology of the ink for the printheads. The obtained foils are notoriously difficult to laminate with a wear layer. WO 2015/140682 proposes to solve this issue by applying an adhesion layer on top of the print.

From WO 2016/146565 it is known to provide a primer layer on a PVC foil to accommodate for a digital print.

SUMMARY

The present invention in the first place seeks to provide an alternative method for manufacturing decorative foils, and, in accordance with several of its preferred embodiments, provides solution to one or more of the problems of the state of the art.

Therefor, the present invention, in accordance with its first independent aspect relates to a method for manufacturing a decorative foil, wherein said method comprises at least the following steps:
- the step of providing a thermoplastic carrier layer;
- the step of providing an ink receiving layer to said carrier layer;
- the step of forming a decorative pattern on said carrier layer by performing a digital printing operation wherein droplets of aqueous inks having a volume smaller than 100 pL are jet to said carrier layer, more particularly to said ink receiving layer, with as a characteristic that said ink receiving layer comprises a binding agent, preferably different from an acrylic copolymer, and/or silica. The present inventor has realized that the use of an ink receiving layer with a binding agent may serve a dual purpose. The binding agent is preferably hydrophilic such that it can cope with the water content of the aqueous ink, and the binding agent is also active in a subsequent lamination of the obtained decorative foil with e.g. a transparent wear layer.

Tests have shown that decorative foils may be obtained that, when digitally printed with aqueous inks, are still suitable for lamination with a transparent PVC foil without the need for an additional adhesion layer. A peel strength of more than 50N per 5 cm was obtained, which the inventor sees as an industrial minimum for use in flooring.

Preferably, a binding agent is applied in the ink receiving layer, which is chosen from the list consisting of polyurethane based binder (PU), an acrylic polyurethane binder, a polyacrylic binder, a polyether, polyvinylalcohol, a vinyl ester, thiol, carbodiimide, polyvinylbutyrate, vinyl chloride vinyl acetate copolymer (VC-VA), acrylic polymer and an aliphatic urethane acrylic binder. According to the most preferred embodiments the binding agent is chosen from the list consisting of polyurethane based binder, acrylic polyurethane, vinyl chloride vinyl acetate copolymer and aliphatic urethane acrylic binder.

Preferably, said binding agent is a high molecular weight water soluble polymer, preferably having a molecular weight above 40000 as defined by Size Exclusion Chromotography (SEC) using tetrahydrofuran (THF) as a solvent and calibrated using a polystyrene standard. The molecular weight of the binding agent may be anywhere between 40000 and 180000.

The addition of silica, or as an alternative aluminum or other water absorbing materials, to the ink receiving layer improves the fixation of the ink droplet, in particular the fixation of the pigments when, as is preferred, used is made of pigment containing inks. Increasing the water retaining capabilities is especially important when the aforesaid digital printing operation is a single pass printing operation, i.e. a printing operation wherein the entire printed pattern is formed in one relative movement of the carrier layer with respect to the printing equipment. Especially in the cases where high throughput speed is aimed at, such as a speed higher than 40 or 60 meter per minute, or even of 100 meter per minute or higher, a high water retention capability of the ink receiving layer is desirable.

Preferably said ink receiving layer comprises pigments and binder with a pigment to binder ratio of 0.85 or more. A pigment to binder ratio of 1 and higher, 1.5 and higher, 2 and higher is not excluded. This preferred amount of pigments in the ink receiving layer provides for a water retention capability which is sufficient for high speed single pass printing, e.g. at 40 meter per minute or more.

In the cases where the present invention is put to practice using a digital printing equipment of the plotter or multipass type, or using a single pass engine operated at low speed, e.g. less than 15 meters per minute, silica may be used in a lesser amount, e.g. at a pigment to binder ratio of less than 0.3, or may be totally or essentially absent in the inkjet receiver coating. The same goes when low ink loads are being applied during the printing operation, such as an ink load lower than 2 grams per square meter.

The type of silica comprised in the inkjet receiver coating may be of the precipitated type. The inventor has found that precipitated silica increases the long term stability of the inkjet receiver coating while the lamination strength is not or only minimally affected. The precipitated silica particles tend to become sterically stabilized when mixed with a high molecular weight water soluble polymer.

The size of the silica particles, as characterized by its d50 particle size determined by means of the laser light scattering granulometry technique according to ISO 13320-1, is preferably smaller than 20 micrometer, for example between 1 and 10 micrometer. Silica particles that are larger are prone to create dustiness of the coating. Preferably, said ink receiving layer comprises silica pigments having a d50 particle size as determined by the laser light scattering granulometry technique, according to 13320-1, lower than 5.5 micrometer.

The silica contained in the ink receiving layer may be a silica gel and/or fumed silica.

According to a special embodiment, the silica contained in the inkjet receiver layer may be modified, for example, the silica may be cationically charged chemically or physically using polydadmac, aluminiumchlorohydrate (ACH), organosilanes or the likes.

Preferably said ink receiving layer comprises silica pigments having a BET value, defined and measured according to ISO 9277, lower than 350 $m^2/g$, or even of 250 $m^2/g$ or lower.

Preferably said ink receiving layer comprises from 25% to 75% by weight, preferably from 45% to 75% by weight, of silica pigments, wherein hereby the dry weight of the ink receiving layer is considered. Clearly, upon application, the substance forming the ink receiving layer may be formed by a dispersion having a solid content lower than 50% by weight. For example said substance may be a dispersion having a solid content of 20% by weight, wherein said solid content is for about half formed by silica pigments. While said substance comprises 10% by weight of silica, the dry weight of the coating will comprise about 50% by weight of silica.

Preferably a surfactant is included in the inkjet receiver coating. A surfactant increases the levelling capabilities of the primer and may be added in an amount of 0.01% to 0.5% by weight.

Tests have shown that lamination strength of carrier layers having an ink receiving layer in accordance with the invention are higher when not printed upon. The aqueous inks applied by the digital printer tend to lower the lamination strength. Therefor, it is preferred that both said ink receiving layer and said ink comprise a binding agent. The binding agent of the ink receiving layer and the ink may both be separately chosen from the above lists. According to the most preferred embodiment the ink receiving layer and the ink comprise the same binding agent. In such case a binding agent is preferably selected that has good adhesion properties in lamination with a wear layer, is compatible with silica and is compatible with ink, more particularly with the printing heads. Preferably the ink including the binding agent remains stable at least up to 60° C.

Preferably the binding agent comprised in the ink is a vinyl chloride-vinyl acetate copolymer, more particularly a terpolymer of vinyl chloride, vinyl acetate and ethylene. Such binding agent is for example available in an aqueous dispersion from the company Wacker Chemie AG under the commercial name Vinnol® CE35. The terpolymer of vinyl chloride, vinyl acetate and ethylene may be either of the block type, the periodic type and the grafted type. As aforestated, the binding agent comprised in the ink receiving layer is preferably the same, namely a vinyl chloride-vinyl acetate copolymer, more particularly a terpolymer of vinyl chloride, vinyl acetate and ethylene.

The inventor has also noted that a vinyl chloride-vinyl acetate copolymer, more particularly a terpolymer of vinyl chloride, vinyl acetate and ethylene, has a suitable viscosity for application in inkjet printing heads, and, is sufficiently resolvable to allow a possible dried ink film formed at the nozzle opening to dissolve again when flushing the nozzle with cleaning fluid or fresh ink. Furthermore, the rheological behavior of the ink is not influenced even when the ink having the binding agent is stored for one week at 60° C. As compared to the use of polyvinylalcohol as a binding agent, less yellowing was observed with vinyl chloride-vinyl acetate copolymer, more particularly with a terpolymer of vinyl chloride, vinyl acetate and ethylene, such as Vinnol® CE35.

In general, preferably, a digital printing equipment having print heads featuring ink recirculation is used to perform the digital printing operation of the invention. Such print heads are for example marketed under the names Xaar1001, XAAR 5601 or Fujifilm Samba.

Preferably, said ink comprises at least 5% by weight of said binding agent. Even better, said ink comprises from 15 to 35% by weight of said binding agent, wherein about 20%, i.e. from 17% to 23% is a good value. The availability of the binding agent also lowers the amount of water in the aqueous ink, which is beneficial for the lamination strength and the water retention requirements set to the ink receiving layer. For example, the amount of silica in the ink receiving layer may be lowered, or the available silica content in the ink receiving layer will be more effective.

Preferably, said ink receiving layer has a pH of less than 6. The inventor has found that the acidity of the ink receiving layer can play an important role in the lamination strength.

Preferably, said ink receiving layer comprises multivalent metal salts or acids. Such component may function as an ink pigment crusher or flocculating agent. Preferably such component is cationic or acidic, for example citric acid or boric acid, preferably at a rate of 5 to 25 percent by weight. Such pigment crusher, for example a cationic or acidic flocculating agent quickly destabilizes the anionic stabilized pigment of the ink, and bleeding of the ink is therefore largely minimized. Further the inventor has noted that acidic flocculating agents, like citric acid, bring about an increase in lamination strength, as compared to salts like $CaCl_2$).

From the above, it is clear that the inkjet receiver layer preferably comprises citric acid and/or boric acid, preferably at a cumulative rate of 5 to 25 percent by weight.

Preferably said step of providing an ink receiving layer to said carrier layer is performed by means of direct or indirect gravure, reverse coating, kiss coating, pressure chamber coating, curtain coating, spraying, dipping or non-contact application by for example jetting. Preferably, the applied substance for the ink receiving layer is dried, e.g. by means of one or more hot-air dryers and/or near-infrared radiators (NIR).

Preferably, the method of the invention is further characterized in that said step of providing said ink receiving layer to said carrier layer comprises at least two substeps, including a first substep wherein pigment and binder is applied to said carrier layer, and a second substep wherein at least binder is applied to said carrier layer and the pigment to binder ratio of the substance applied in said second substep is lower than the pigment to binder ratio of the substance applied in said first substep and/or the substance applied in said second substep is wholly or essentially free from pigment. The method of the present preferred embodiment allow to decrease the dustiness of the inkjet receiver coating as a whole, even when the inkjet receiver coating as a whole, i.e. seen in average of the substances applied in all substeps, has a high pigment to binder ratio, for example a pigment to binder ratio of 0.85 or higher, or even 1 or higher. A high pigment to binder ratio is beneficial for the printing quality, but has a negative effect on lamination strength and dustiness. These negative effects are lessened by the present preferred embodiment. The substance with the higher pigment to binder ratio interferes less with the lamination, and dustiness is prevented due to the substance applied in a subsequent substeps, i.e. the second sub step.

From the above, it is clear that said aqueous ink, and preferably said ink receiving layer as well, comprise a terpolymer of vinyl chloride, vinyl acetate and ethylene as a binding agent. As an alternative, yielding similar results from the point of view of lamination strength, said ink receiving layer, and preferably said ink as well, may comprise at least a cationic binding agent, such as cationic polyurethane. As a further alternative, yielding similar results, said ink receiving layer, and preferably said ink as well, comprises a waterborne aliphatic polyurethane dispersion as a binding agent.

It is further clear that the decorative foil obtained through any of the methods disclosed in the first aspect may be used in a lamination process, e.g. to manufacture decorative panels. It is hence clear that the invention in accordance with a second independent aspect concerns a method for manufacturing a decorative panel or sheet, having a substrate, a decorative pattern provided on a carrier layer and a transparent wear layer, with as a characteristic that said method at least comprises laminating said wear layer on top of a decorative foil obtained through the method of the first aspect and/or the preferred embodiments thereof, said decorative foil comprising said decorative pattern and said carrier layer.

Preferably, said carrier layer is a thermoplastic film, preferably a PVC film, and still better a PVC film of the "rigid" type, namely with less than 10% or less than 5% plasticizer, or even without any plasticizer. As the digital print is provided on a thermoplastic film, this can be incorporated in the floor panel in a sustainable manner Herein, a low content of plasticizer is advantageous as, with a possible heat treatment or hot press treatment thereof a better dimensional accuracy can be maintained.

Preferably, said carrier layer is surface activated before applying the substance of the ink receiving layer, for example by means of a corona or plasma treatment.

Preferably, the decorative panel is a floor panel of the vinyl type, more particularly a so-called vinyl tile, a WPC floor panel or SPC floor panel.

The transparent wear layer preferably relates to a thermoplastic wear layer, such as a transparent PVC layer which is adhered to the underlying layers of the floor panel, in particular with the digital print by means of a hot press treatment. This lamination of the PVC layer on the digital print can be performed, for example, at a temperature of approximately 130-170° C., and still better of approximately 150 to 170° C.

Preferably, said wear layer is free from corundum particles or other wear-resistant particles. The top layer of the decorative panel can be finished with a lacquer layer, which is provided as a liquid layer on said wear layer and subsequently is solidified. Preferably, this relates to a lacquer layer which can be solidified by means of UV light. Preferably, a lacquer layer is provided on top of the possible wear layer.

Preferably, the floor panel according to the invention relates to a floor panel, wherein this floor panel, or at least the substrate of the floor panel, substantially is constructed of a thermoplastic material, preferably of a soft thermoplastic material. There are various possibilities for constructing such floor panel, and two possibilities thereof will be presented below.

According to a first and most preferred possibility, the floor panel, or anyhow at least the substrate of the floor panel, is constructed of a plurality of material layers, preferably layers of thermoplastic material, more particularly of soft thermoplastic material. The different layers of thermoplastic material of the substrate possibly may enclose between them one or more glass fiber layers, such as a glass fiber cloth or glass fiber fleece. According to the most preferred embodiment, the substrate consists of two soft PVC layers, which between them enclose a glass fiber layer, preferably a glass fiber fleece or so-called "non-woven". Preferably, these layers of the substrate further also comprise fillers, such as an amount of chalk or limestone. Preferably, the panels have a density between 1250 and 2250 kilograms per cubic meter.

According to a second possibility, the substrate of the floor panel is constructed of a thermoplastic material board. This may relate, for example, to a filled synthetic material board, which may be wholly or partially foamed, or not. Preferably at least the board is foamed centrally in its thickness, while the board comprises unfoamed surface layer at its top and bottom surface.

According to a preferred embodiment, the floor panel, or anyhow at least the substrate of the floor panel, substantially is composed of polyvinyl chloride, more particularly of soft polyvinyl chloride, namely PVC containing plasticizers. Preferably, use is made of PVC obtained from a PVC homopolymer of suspension quality having a K value between 50 and 80 or still better between 60 and 67.

It is noted that the floor panel of the invention preferably comprises a substrate which contains plasticizers. According to a specific embodiment, this relates to a floor panel wherein this floor panel comprises a substrate containing plasticizers of the type DINP or DINCH, more particularly with a mass ratio of 20% to 40%, possible filler material not taken into account.

According to a variant, this relates to a floor panel wherein this floor panel is substantially free from plasticizers, for example with an amount of plasticizer lower than 5 phr.

As aforementioned, the floor panel of the invention, apart from the synthetic material, may also comprise a filler material, preferably chalk or a chalk-like material, such as limestone or talcum. Applying a filler material in particular serves for reducing the amount of synthetic material required and/or for rendering the panel heavier. In some cases, a heavier panel has the advantage that the panel is more stable and/or remains better at its location during placement and/or after installation.

Preferably, the panel of the invention relates to a rectangular floor panel, either oblong or square. Preferably, such floor panel is provided with coupling parts on at least a first pair of opposite edges, which coupling parts are of the type allowing to couple two of such floor panels to each other by means of a downward movement of one floor panel in respect to the other, and/or are of the type allowing to couple two of such floor panels to each other along the respective edges by means of a turning movement. Preferably, said coupling parts then provide for a vertical and horizontal locking. Preferably, the coupling parts are made in one piece with the floor panel.

The present invention is particularly suited, however, not in a restrictive manner, for thin floor panels, more particularly for floor panels having a thickness of 2 millimeters through 6 millimeters and more particularly of 3 millimeters through 5 millimeters.

According to a possible embodiment of the present invention, the floor panel shows the following characteristics:
- the floor panel substantially is composed of, on the one hand, a core or a substrate, wherein this core or this substrate is constructed of material forming the basic material of the floor panel, and, on the other hand, of a top layer, in other words, a surface layer, which top layer as such may or may not be composed of a plurality of layers, including a decorative foil obtained in accordance with the first aspect of the invention or the preferred embodiments thereof;
- the basic material of the floor panel, of which said core is composed, substantially comprises soft thermoplastic material, wherein this thermoplastic material possibly contains a filler;
- and said top layer comprises a printed thermoplastic film obtained through the method of the first aspect of the invention or the preferred embodiments thereof and a transparent thermoplastic wear layer, wherein said transparent thermoplastic wear layer is thinner than 0.85 millimeters and is free from fillers.

It is clear that the invention also relates to a floor covering which is composed of floor panels as described herein above.

The panel or floor panel of the invention preferably comprises at least one reinforcement layer, preferably formed of fibers, more particularly reinforcement fibers, such as glass fibers. The use of such reinforcement layer, and in particular a reinforcement layer with fibers, increases the dimensional stability of the floor panels. This is of particular importance with floor panels for non-glue installation, as by the application of fibers the expansion and/or shrinkage of the panel under the influence of the temperature differences can be reduced considerably. Hereby, the risk can be further minimized that the coupled floor panels will separate from each other as a result of expansion and/or shrinkage. It is noted that the aforementioned reinforcement fibers may be present in various forms, such as also in the form of, for example, a cloth, a fleece or a net, more particularly, for example, a glass fiber cloth or a glass fiber fleece. Preferably, seen in cross-section of the panel, said fibers are applied in one or more horizontal layers.

In the case that a single reinforcement layer, for example, a single layer with fibers, is applied, this layer preferably is situated in the middle or approximately in the middle of the panel. In this manner, a symmetrical construction of the floor panel is obtained, which offers advantages in respect to the stability of the floor panel. According to a particularly preferred embodiment, two or more reinforcement layers are applied, which preferably are located at a distance from each other. In the case of two reinforcement layers, these, seen in cross-section, preferably are situated on both sides of the neutral line of the floor panel. Hereby, the advantage is obtained that bending forces can be counteracted in both directions. This is particularly advantageous with relatively supple floor panels which substantially are made of soft PVC.

It is clear that the decorative foil obtained through the method of the first aspect may also be used in a method for manufacturing decorative sheets, such as wall-to-wall floor coverings. Such floor coverings are, in the art, referred to as heterogeneous vinyl floor coverings or so-called "cushion vinyl". In such floor coverings, also a transparent thermoplastic wear layer, for example, a PVC wear layer, is provided on a print.

Generally, it is noted that the transparent wear layer preferably substantially consists of PVC having a plasticizer content of 10% or less. Preferably, this relates to a transparent wear layer, which is applied as a film or foil. However, it is not excluded that the PVC of the wear layer may be applied in liquid form or as a paste, after which it is solidified or gelled on the print.

DESCRIPTION OF NON-LIMITING EMBODIMENTS

With the intention of further illustrating the invention, here below, without any limitative character, some comparative and preferred embodiments are listed in two example series.

Example Series 1

A rigid PVC foil of 0.07 mm thickness was surface activated with corona treatment and was provided with an inkjet receiver layer having a vinyl chloride vinyl acetate binding agent, more particularly a terpolymer of vinyl chloride, vinyl acetate and ethylene, and silica at a pigment to binder ratio PB as indicated in the first and second column of the below table. The silica applied was of the precipitated type with a d50 particle size of 5 micrometer. The inkjet receiver coating further comprised 15 percent by weight of a flocculating agent as mentioned in the third column. In some embodiments the inkjet receiver coating was applied using two substeps ("dual layer") in accordance with the preferred embodiment listed above. In such case, the substance applied in the second substep did not contain silica pigments.

Each prepared rigid PVC foil was then digitally printed with an aqueous ink and laminated to a transparent PVC wear layer of 0.5 mm thickness. The lamination was performed for 10 seconds at 165° C. and at a pressure of 1 kg/cm$^2$ followed by 165 seconds at 165° C. and at a pressure of 4 kg/cm$^2$.

The prepared foil, the print and the resulting laminated product were examined for dustiness, image quality, adhesion or lamination strength and ink loading capacity. Image quality is analyzed visually after printing a technical image with a plotter, more particularly a plotter commercially available from the company Epson. These properties were qualified on a scale from 0 to 5, resembling bad to perfect. The sum of the scores on all of the four properties provides a ranking of the several setups, where the highest sum is the most technically desirable result. However any result having a sum equal to 15 and more may be acceptable for an industrial process.

| Binder | PB-ratio | Flocculating agent | Duallayer | Dust | Images | Adhesion | Inkload | Sum |
|---|---|---|---|---|---|---|---|---|
| None | 0 | / | No | 5 | 0 | 0 | 0 | 5 |
| VCVA | 0 | / | No | 5 | 0 | 5 | 1 | 11 |
|  |  |  | Yes |  |  |  |  | 11 |
|  |  | CaCl2 | No |  | 1 | 4 |  | 11 |
|  |  |  | Yes |  |  |  |  | 11 |
|  |  | Cirtic acid | No |  | 1 | 5 |  | 12 |
|  |  |  | Yes |  |  |  |  | 12 |
|  | 0.5 | / | No | 4 | 2 | 3 | 2 | 11 |
|  |  |  | Yes | 5 |  | 4 | 3 | 14 |
|  |  | CaCl2 | No | 4 | 5 | 2 | 2 | 13 |
|  |  |  | Yes | 5 |  | 3 | 3 | 16 |
|  |  | Cirtic acid | No | 1 | 5 | 4 | 2 | 12 |
|  |  |  | Yes | 5 |  | 5 | 3 | 18 |
|  | 1 | / | No | 3 | 2 | 2 | 4 | 11 |
|  |  |  | Yes | 5 |  | 4 | 5 | 16 |
|  |  | CaCl2 | No | 3 | 5 | 1 | 4 | 13 |
|  |  |  | Yes | 5 |  | 3 | 5 | 18 |
|  |  | Cirtic acid | No | 3 | 5 | 3 | 4 | 15 |
|  |  |  | Yes | 5 |  | 5 | 5 | 20 |
|  | 2 | / | No | 1 | 3 | 1 | 4 | 9 |
|  |  |  | Yes | 4 |  | 3 | 5 | 15 |
|  |  | CaCl2 | No | 1 | 5 | 1 | 4 | 11 |
|  |  |  | Yes | 4 |  | 3 | 5 | 17 |
|  |  | Cirtic acid | No | 1 | 5 | 2 | 4 | 12 |
|  |  |  | Yes | 4 |  | 4 | 5 | 18 |

Legend
0 Bad
5 Perfect

From the results it can be gleaned that the higher pigment to binder ratio gives a higher dustiness, unless "dual layer" is applied. The image quality grows with higher pigment to binder ratio and the adhesion generally drops. The "dual layer" and the availability of a cationic flocculating agent like citric acid lifts the adhesion or lamination strength back up.

The best inkjet receiver coating from the results is the one having a pigment to binder ratio of 1, having been applied in two substeps ("dual layer"), in accordance with the preferred embodiment listed above, and comprising citric acid. Several other results are also well acceptable.

Depending on ink load and the desired image quality, other coatings from the present series may be acceptable. For example, with low ink load, a coating having a pigment to binder ratio of zero, or nearly zero, may be acceptable, and such is not excluded in the context of the present invention, as, in some cases, the criteria of dust creation and/or adhesion may be considered the most important.

Example Series 2

It was proceeded similarly as in example series 1 above, but instead off a vinyl chloride-vinyl acetate binding agent, a polyurethane binding agent has been applied. The results are summarized in the same way in the below table.

| Binder | PB-ratio | Flocculating agent | Duallayer | Dust | Images | Adhesion | Inkload | Sum |
|---|---|---|---|---|---|---|---|---|
| None | 0 | / | No | 5 | 0 | 0 | 0 | 5 |
| PU | 0 | / | No | 5 | 0 | 5 | 0 | 10 |
|  |  |  | Yes |  |  |  |  | 10 |
|  |  | CaCl2 | No |  | 1 | 4 |  | 10 |
|  |  |  | Yes |  |  |  |  | 10 |
|  |  | Cirtic acid | No |  | 1 | 5 |  | 11 |
|  |  |  | Yes |  |  |  |  | 11 |
|  | 1 | / | No | 5 | 2 | 4 | 4 | 15 |
|  |  |  | Yes | 5 |  | 5 | 4 | 16 |
|  |  | CaCl2 | No | 5 | 5 | 4 | 4 | 18 |
|  |  |  | Yes | 5 |  | 5 | 4 | 19 |
|  |  | Cirtic acid | No | 5 | 5 | 5 | 4 | 19 |
|  |  |  | Yes | 5 |  | 5 | 4 | 19 |
|  | 2 | / | No | 3 | 2 | 5 | 5 | 15 |
|  |  |  | Yes | 5 |  | 5 | 5 | 17 |
|  |  | CaCl2 | No | 3 | 5 | 3 | 5 | 16 |
|  |  |  | Yes | 5 |  | 4 | 5 | 19 |
|  |  | Cirtic acid | No | 3 | 5 | 4 | 5 | 17 |
|  |  |  | Yes | 5 |  | 5 | 5 | 20 |

-continued

| Binder | PB-ratio | Flocculating agent | Duallayer | Dust | Images | Adhesion | Inkload | Sum |
|---|---|---|---|---|---|---|---|---|
| | 3 | / | No | 1 | 3 | 3 | 5 | 12 |
| | | | Yes | 4 | | 5 | 5 | 17 |
| | | CaCl2 | No | 1 | 5 | 2 | 5 | 13 |
| | | | Yes | 4 | | 5 | 5 | 19 |
| | | Cirtic acid | No | 1 | 5 | 3 | 5 | 14 |
| | | | Yes | 4 | | 5 | 5 | 19 |

Legend
0 Bad
5 Perfect

From the results it can be gleaned that the higher pigment to binder ratio gives a higher dustiness, unless "dual layer" is applied. The image quality grows with higher pigment to binder ratio and the adhesion generally drops. The "dual layer" and the availability of a cationic flocculating agent like citric acid lifts the adhesion or lamination strength back up.

The best inkjet receiver coating from the results is the one having a pigment to binder ratio of 2, having been applied in two substeps ("dual layer"), in accordance with the preferred embodiment listed above, and comprising citric acid. Several other results are also well acceptable.

The present invention is in no way limited to the embodiments described herein above; on the contrary, such decorative films, floor panels or wall-to-wall floor coverings and methods for manufacturing them can be realized according to various variants, without leaving the scope of the present invention.

The invention claimed is:

1. A method for manufacturing a decorative foil, the method comprising:
    providing a thermoplastic carrier layer;
    providing an ink receiving layer to the carrier layer; and
    forming a decorative pattern on the carrier layer by performing a digital printing operation wherein droplets of an aqueous ink having a volume smaller than 100 pL are jet to the ink receiving layer;
    wherein the ink receiving layer comprises a binding agent; and
    wherein the aqueous ink comprises a terpolymer of vinyl chloride, vinyl acetate and ethylene as a binding agent.

2. The method of claim 1, wherein the binding agent of the ink receiving layer is the same as the binding agent of the aqueous ink.

3. The method of claim 1, wherein the ink receiving layer comprises silica pigments having a BET value lower than 350 m$^2$/g.

4. The method of claim 1, wherein the ink receiving layer comprises from 25% to 75% by weight of silica pigments.

5. The method of claim 1, wherein the ink receiving layer comprises pigments and binder with a pigment to binder ratio of 0.85 or more.

6. The method of claim 1, wherein the ink receiving layer has a pH of less than 6.

7. The method of claim 1, wherein the ink receiving layer comprises a cationic flocculating agent.

8. The method of claim 1, wherein the ink receiving layer comprises citric acid.

9. The method of claim 1, wherein providing the ink receiving layer to the carrier layer comprises,
    a first substep wherein a first substance including pigment and binder is applied to the carrier layer, and
    a second substep wherein a second substance including at least binder is applied to the carrier layer and the pigment to binder ratio of the second substance applied in the second substep is lower than the pigment to binder ratio of the first substance applied in the first substep.

10. The method of claim 1, wherein the ink receiving layer comprises at least a cationic binding agent.

11. The method of claim 1, wherein the ink receiving layer comprises a waterborne aliphatic polyurethane dispersion as the binding agent.

12. The method of claim 1, wherein the ink receiving layer comprises silica pigments having a d50 particle size as determined by the laser light scattering granulometry technique, according to 13320-1, lower than 5.5 micrometer.

13. The method of claim 1, wherein the ink receiving layer comprises silica gel or fumed silica.

14. A method for manufacturing a decorative panel, having a substrate, a decorative pattern provided on a carrier layer and a transparent wear layer, the method comprising:
    performing the method of claim 1 to provide a decorative foil; and
    laminating the wear layer on top of the decorative foil.

* * * * *